(12) United States Patent
Nomura et al.

(10) Patent No.: US 9,581,503 B2
(45) Date of Patent: Feb. 28, 2017

(54) SENSOR AND SENSOR MOUNTING STRUCTURE

(71) Applicant: NGK SPARK PLUG CO., LTD., Nagoya-shi, Aichi-ken (JP)

(72) Inventors: Takuma Nomura, Komaki (JP); Go Hanzawa, Konan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/753,653

(22) Filed: Jun. 29, 2015

(65) Prior Publication Data

US 2016/0003649 A1 Jan. 7, 2016

(30) Foreign Application Priority Data

Jun. 30, 2014 (JP) ................................. 2014-134821
Jun. 4, 2015 (JP) ................................. 2015-113926

(51) Int. Cl.
| | |
|---|---|
| *G01D 11/24* | (2006.01) |
| *G01K 1/08* | (2006.01) |
| *G01D 11/30* | (2006.01) |
| *G01K 1/14* | (2006.01) |

(52) U.S. Cl.
CPC ............... *G01K 1/08* (2013.01); *G01D 11/30* (2013.01); *G01K 1/14* (2013.01)

(58) Field of Classification Search
CPC ........................... G01D 11/24; G01N 27/4078
USPC ......................................................... 73/431
See application file for complete search history.

(56) References Cited

U.S. PATENT DOCUMENTS

2012/0255356 A1* 10/2012 Kume ................ G01N 27/4078
73/431

FOREIGN PATENT DOCUMENTS

JP 5469693 B2 4/2014

* cited by examiner

*Primary Examiner* — Lisa Caputo
*Assistant Examiner* — Jamel Williams
(74) *Attorney, Agent, or Firm* — Sughrue Mion, PLLC

(57) ABSTRACT

A sensor (200) includes a temperature sensitive element (203); a first tubular member (212); a tubular rib (240); a second tubular member (260); and a tubular mounting member (250) that surrounds the rib through the second tubular member, is rotatable with respect to the rib, and has a threaded portion (254). The rib includes a main body (243) and a protruding portion (242). A flat portion (244L) is formed on a rearward-facing surface of the protruding portion, and an inclined surface (242*b*) is formed radially outward of the flat portion. A forward-facing surface (250*f*) of the mounting member is in line contact with the inclined surface at a prescribed contact position (P), and an intersection (R) of the inclined surface and a perpendicular (M) thereto from a radially innermost point (Q) of a forward-facing surface (244*f*) of the protruding portion is located radially inward of the contact position.

4 Claims, 7 Drawing Sheets

SENSOR AND SENSOR MOUNTING STRUCTURE

TECHNICAL FIELD

The present invention relates to a sensor such as a temperature sensor or a gas sensor and to a sensor mounting structure.

BACKGROUND ART

Temperature sensors for detecting temperature of exhaust gas from internal combustion engines have been used, and gas sensors for detecting the concentration of a particular component (such as oxygen) in the exhaust gas have also been used. A threaded portion is provided externally of each sensor, and the sensor is mounted to a mount body (such as an exhaust pipe) by screwing the threaded portion into a mounting hole of the mount body.

Generally, to mount a sensor to an exhaust pipe, the sensor is first mounted to the exhaust pipe, and then a connector connected to lead wires extending from the sensor is connected to a connector of, for example, an external circuit. However, when the sensor is integrated with the external circuit with no connector or when the connector is fixed before the sensor is fixed, the external circuit and/or the lead wires must be rotated together with the sensor when the sensor is screwed into the mounting hole, and difficulty arises in mounting the sensor.

In view of the above difficulty, a technique is disclosed in which a tubular rotary member (mounting member) having a threaded portion formed on its outer surface is disposed so as to surround a rib (housing) holding a sensor such that the rotary member is rotatable with respect to the rib (see Patent Document 1). With this technique, even when the sensor is integrated with an external circuit, it is not necessary to rotate the external circuit together with the sensor when the sensor is screwed into a mounting hole.

In the technique disclosed in Patent Document 1, an outward tapered surface is provided on a rearward-facing surface of the rib, and a corner portion is provided on a forward-facing surface of the rotary member and is brought into contact with the tapered surface to form a seal. In this case, the tapered surface allows the corner portion and thus the rotary member to expand radially outward. Therefore, the threaded portion on the outer surface of the rotary member is also expanded radially outward and is tightly engaged with a female threaded portion of the mount body, so that the threaded portion is unlikely to be loosened.

PRIOR ART DOCUMENT

Patent Document

[Patent Document 1] Japanese Patent No. 5469693 (FIGS. 1 and 3)

SUMMARY OF THE INVENTION

Problem to be Solved by the Invention

For example, a temperature sensor is mounted to an exhaust gas purifier of a vehicle, and the exhaust gas purifier is disposed outside an engine room. Therefore, when the exterior of the temperature sensor increased in temperature by the exhaust gas is cooled rapidly as a result of adhesion of water thereto, thermal stress is applied to the threaded portion of the temperature sensor and the mounting hole of the mount body to thereby cause them to expand and contract, and this may cause the threaded portion to be loosened.

Particularly, a temperature sensor mounted to protect a turbocharger from erosion is required to have improved heat resistance, and a high heat resistant material typified by, for example, an austenite-based material tends to be used for components of the temperature sensor. Materials that can be used for a turbocharger are limited because of its production method, and a ferrite-based material is generally used. In this case, the difference in thermal expansion coefficient between the material of the temperature sensor and the material of the mount body becomes large, so that the threaded portion is more likely to be loosened. To prevent the threaded portion from being loosened, the tightening torque of the temperature sensor must be larger than that of other members, and this causes a reduction in overall assembly efficiency of a vehicle.

With the technique described in Patent Document 1, stress is applied to the vicinity of the tapered surface of the rib that is in contact with the corner portion of the rotary member (mounting member). Therefore, in the case of a sensor having a structure in which a tubular member (joint) is fitted onto the rear end of the rib and the mounting member surrounds the radial circumference of the rib through the joint, if the tubular member (joint) is joined to the vicinity of the tapered surface that is in contact with the corner portion, the above-mentioned stress is applied also to the tubular member, and this may cause a reduction in joint strength or deformation of the tubular member.

Accordingly, an object of the present invention is to provide a sensor which is to be threadedly mounted to a mounting hole of a mount body and in which a tubular member is fitted onto a rear end portion of a rib and to provide a sensor mounting structure. The sensor and the sensor mounting structure greatly restrain loosening of the threaded portion without impairing workability of attachment of the sensor, and restrain a reduction in joint strength of the tubular member and deformation of the tubular member.

Means for Solving the Problem

In order to solve the above-described problem, a sensor of the present invention comprises a temperature sensitive element whose electrical property changes with temperature; a first tubular member that has a tubular shape and extends in a direction of an axial line, the temperature sensitive element being enclosed by the first tubular member at a forward end thereof; a tubular rib that surrounds a radial circumference of the first tubular member with the forward end of the first tubular member protruding from a forward end of the rib; a second tubular member that has a tubular shape, surrounds a radial circumference of a rear end portion of the rib, and extends rearward in the direction of the axial line; and a tubular mounting member that surrounds the radial circumference of the rib through the second tubular member and is rotatable with respect to the rib, the tubular mounting member having on an outer surface thereof a threaded portion. The rib includes a main body and a protruding portion, the main body being disposed inside the mounting member, a forward end portion of the second tubular member being fitted onto the main body, the protruding portion being disposed forward of the main body, protruding radially outward beyond an inner surface of the mounting member, surrounding the radial circumference of the first tubular member, and having a forward-facing surface including a flat surface parallel to a radial direction. In a cross-sectional view taken in the direction of the axial line, the protruding portion has a rearward-facing surface including a flat portion and an inclined surface, the flat portion being parallel to the radial direction, having a length equal to greater than the thickness of the second tubular member, and facing a forward-facing surface of the second tubular member, the inclined surface being disposed radially outward of the flat portion and extending radially outward such that the diameter of the inclined surface increases toward a forward end side with respect to the direction of the axial line. A forward-facing surface of the mounting member is in line contact with the inclined surface at a prescribed contact position. In the cross-sectional view, an intersection of the inclined surface and a perpendicular thereto from a radially innermost point of the forward-facing surface of the protruding portion is located radially inward of the contact position.

In this sensor, the above-mentioned intersection is located radially inward of the contact position at which the protruding portion and the mounting member are in line contact with each other. In this case, the contact position and thus pressing force transmitted from the mounting member are shifted radially outward, and a larger amount of the pressing force is applied to a radially outward portion of the mounting surface in a concentrated manner, so that the seal between the protruding portion and the mounting surface becomes more firm. As a result, loosening of the threaded portion can be restrained significantly.

The pressing force is applied to the periphery of the contact position, and the second tubular member is joined to a portion radially inward of the inclined surface of the protruding portion. Therefore, by shifting the contact position and thus the pressing force radially outward, the contact position can be spaced away from the second tubular member. In this case, a reduction in the joint strength and deformation of the second tubular member that are caused by the pressing force applied to a joint portion of the second tubular member can be suppressed.

In addition, since the flat portion is provided on the rib, the forward-facing surface of the second tubular member comes into surface contact with the flat portion, whereby the pressure of contact decreases. Therefore, deformation of the second tubular member can be suppressed even when the pressing force for fitting the second tubular member onto the rib to attach the second tubular member thereto is large or when the depth of insertion is large.

The sensor according to the present invention may be configured in such a manner that when the threaded portion of the mounting member is screwed into a mounting hole of a mount body, the forward-facing surface of the protruding portion abuts against a mounting surface of the mount body, and a forward end portion of the first tubular member protrudes into the mount body through the mounting hole, and in the cross-sectional view, a second intersection of the inclined surface and a perpendicular thereto from a point of contact that is a radially innermost point at which the forward-facing surface of the protruding portion abuts against the mounting surface is located radially inward of the contact position.

In this sensor, the second intersection is located radially inward of the contact position. Therefore, the contact position and thus the pressing force are shifted radially outward, and a larger amount of the pressing force is applied to the radially outward portion of the mounting surface, so that the seal between the protruding portion and the mounting surface becomes more firm.

In the sensor of the present invention, the inclined surface may be a tapered surface that extends radially outward such that the diameter of the tapered surface increases gradually toward the forward end side with respect to the direction of the axial line.

In this sensor, the protruding portion and the mounting member are in line contact with each other in a reliable manner. Therefore, the pressing force transmitted from the mounting member can be more concentrated on the mounting surface.

A sensor mounting structure of the present invention comprises a mount body having a mounting hole; and a sensor having on an outer surface thereof a threaded portion threadedly mounted to the mount body, the sensor being threadedly mounted to the mount body with the threaded portion screwed into the mounting hole of the mount body, wherein the sensor is a sensor according to any one of claims 1 to 3.

In this sensor mounting structure, the above-mentioned intersection is located radially inward of the contact position at which the protruding portion and the mounting member are in line contact with each other. Therefore, the contact position and thus the pressing force transmitted from the mounting member are shifted radially outward, and a larger amount of the pressing force is applied to a radially outward portion of the mounting surface in a concentrated manner, so that the seal between the protruding portion and the mounting surface becomes more firm. As a result, loosening of the threaded portion can be restrained significantly.

The pressing force is applied to the periphery of the contact position, and the second tubular member is joined to a portion radially inward of the inclined surface of the protruding portion. Therefore, by shifting the contact position and thus the pressing force radially outward, the contact position can be spaced away from the second tubular member. In this case, a reduction in the joint strength and deformation of the second tubular member that are caused by the pressing force applied to the joint portion of the second tubular member can be suppressed.

In addition, since the flat portion is provided on the rib, the forward-facing surface of the second tubular member comes into surface contact with the flat portion, whereby the pressure of contact decreases. Therefore, deformation of the second tubular member can be suppressed even when the pressing force for fitting the second tubular member onto the rib to attach the second tubular member thereto is large or when the depth of insertion is large.

Effects of the Invention

According to the present invention, in the sensor which is threadedly mounted to a mounting hole of a mount body and in which the tubular member is fitted onto a rear end portion of the rib, it is possible to greatly restrain loosening of the threaded portion without impairing workability during mounting of the sensor and to restrain a reduction in the joint strength of the tubular member and deformation of the tubular member.

MODES FOR CARRYING OUT THE INVENTION

Embodiments of the present invention will next be described.

Figure 1:
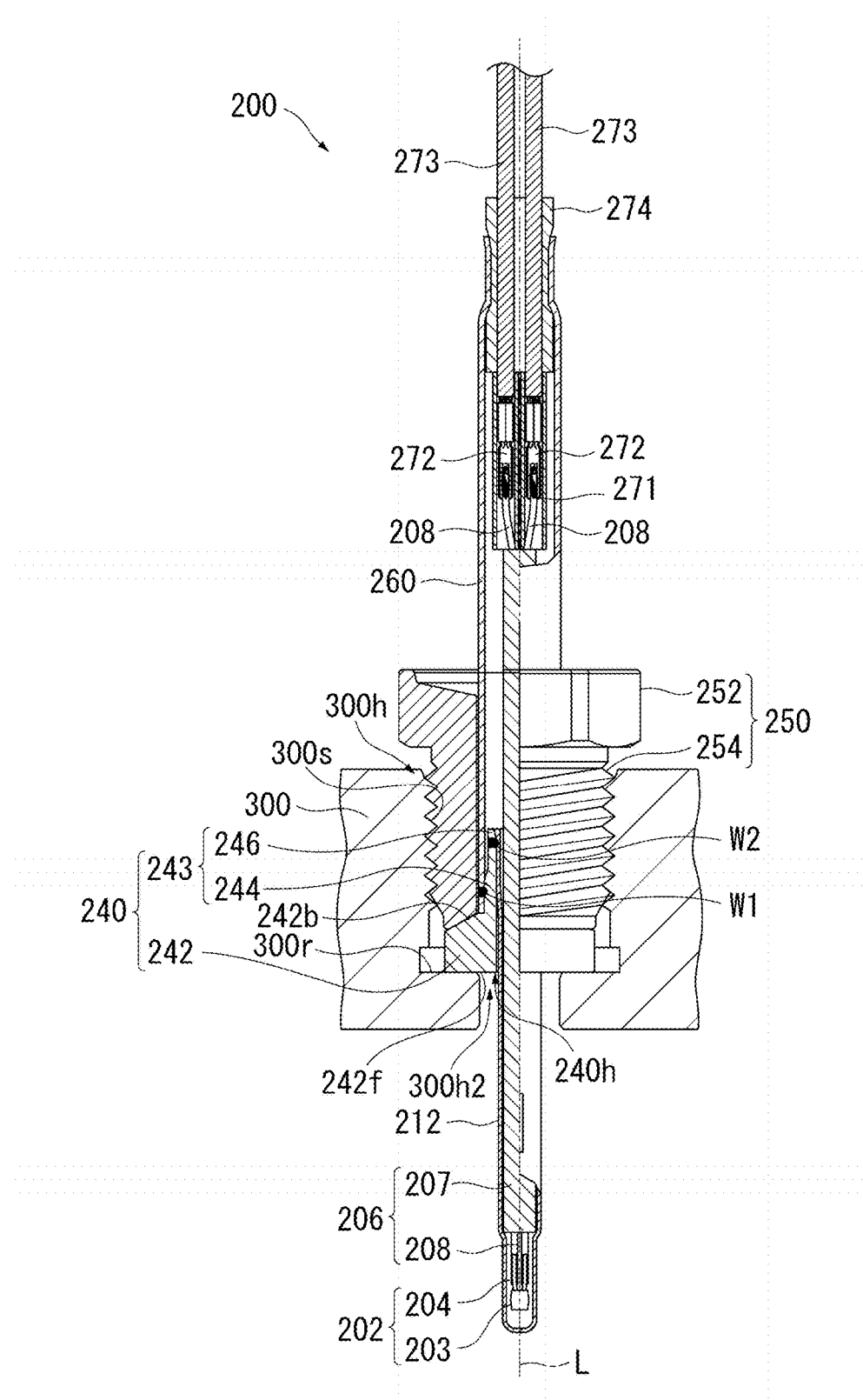
FIG. 1 is an axial cross-sectional view of a temperature sensor according to a first embodiment of the present invention.
Figure 2:
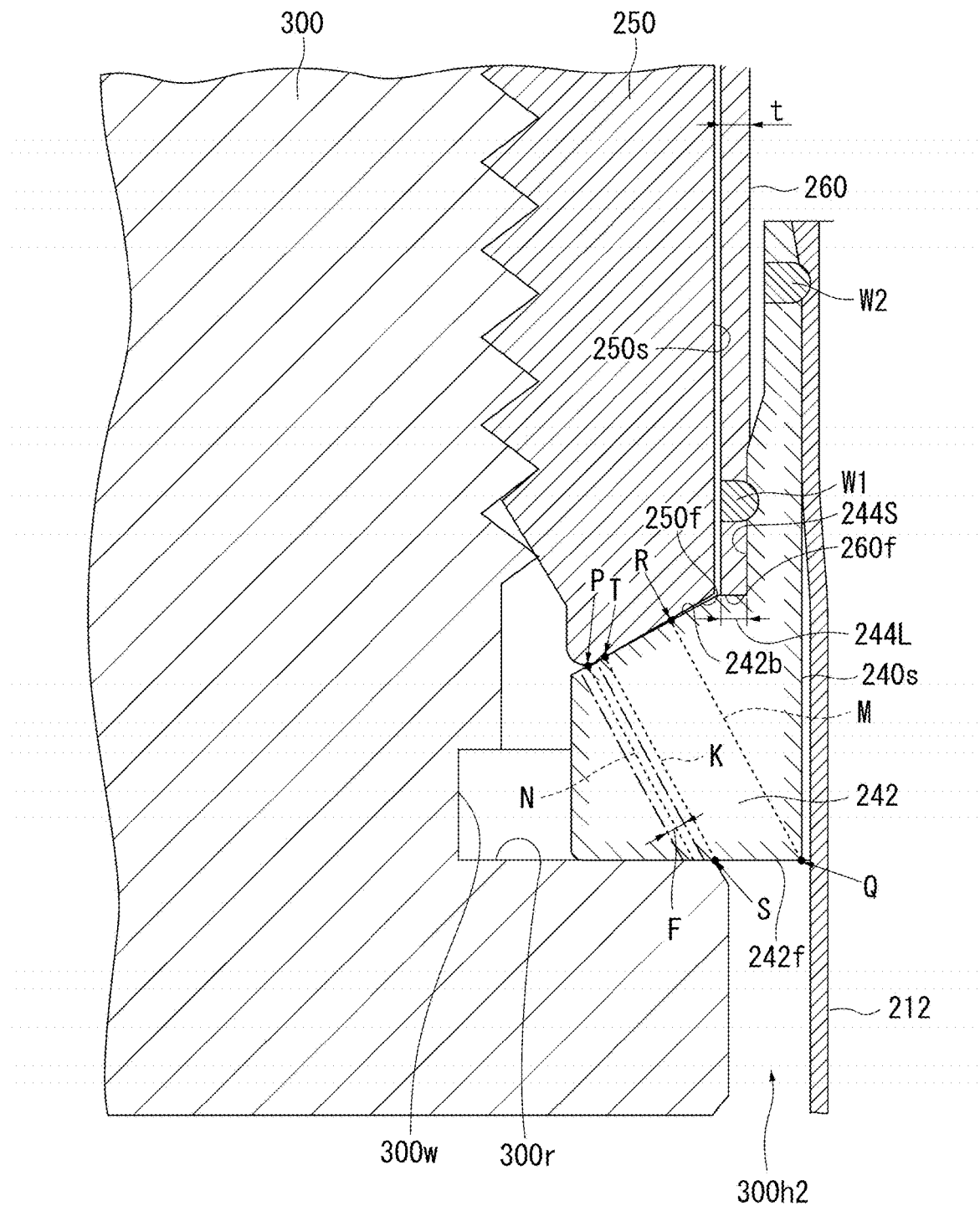
FIG. 2 is an enlarged partial cross-sectional view of FIG. 1.

FIG. 1 is a partially cutaway cross-sectional view of a sensor (temperature sensor) 200 according to a first embodiment of the present invention, the cross-sectional view taken in the direction of an axial line L. FIG. 2 is an enlarged partial cross-sectional view of FIG. 1. FIG. 2 corresponds to the "cross-sectional view taken in the direction of the axial line" in the claims.

The temperature sensor 200 is inserted into a mounting hole 300h of a mount body (exhaust gas purifier) 300 and threadedly mounted to the mount body 300 to detect the temperature of, for example, exhaust gas from an automobile. The temperature sensor 200 includes a tubular metal tube 212 with a bottom which extends in the direction of the axial line L and has a closed forward end (bottom) and an open rear end; a rib (housing) 240 joined to the rear end of the metal tube 212; a mounting member 250 provided separately from the rib 240; and a joint 260 that surrounds at least part of a sheath member 206 described later, has a forward end joined to the rib 240, and extends in the direction of the axial line L. The direction of the axial line L is the lengthwise direction of the temperature sensor 200 and corresponds to the vertical direction in FIG. 1. The forward end side is the lower side in FIG. 1, and the rear end side is the upper side in FIG. 1.

The metal tube 212 and the joint 260 correspond to the "first tubular member" and the "second tubular member," respectively, in the claims.

The temperature sensor 200 includes a thermistor element 202 composed of a thermistor sintered body 203 and element electrode wires 204 that are disposed inside the metal tube 212. This temperature sensor 200 may be attached to, for example, an exhaust pipe of an internal combustion engine or an exhaust gas purifier such that the thermistor element 202 is disposed inside the exhaust pipe or exhaust gas purifier through which exhaust gas flows and may be used to detect the temperature of the exhaust gas.

The thermistor sintered body 203 corresponds to the "temperature sensitive element" in the claims.

The sheath member 206 includes a sheath tube 207 and two sheath conductors 208 held inside the sheath tube 207 in an insulated condition and is disposed inside the metal tube 212, the rib 240, and the joint 260. The sheath conductors 208 extending from the forward end of the sheath tube 207 and the element electrode wires 204 of the thermistor element 202 are joined to each other by, for example, laser welding. The sheath conductors 208 extending from the rear end of the sheath tube 207 are connected to connection lead wires 273 for an external circuit (such as an electronic control unit (ECU) of a vehicle) through crimp terminals 272. The sheath conductors 208 extending from the rear end of the sheath tube 207 and the crimp terminals 272 are insulated from each other through an insulating tube 271. Each of the lead wires 273 is a conducting wire coated with an insulating coating and is disposed so as to extend through the inside of a heat resistant rubber-made seal member 274.

The rib 240 has a tubular shape extending in the direction of the axial line and having a through hole 240h at the center. The rib 240 holds the metal tube 212 in the through hole 240h in a state in which the rear end of the metal tube 212 is surrounded by the rib 240, and the forward end of the metal tube 212 in which the thermistor sintered body 203 is accommodated protrudes from the forward end of the rib 240.

The rib 240 includes a main body 243 disposed inside the mounting member 250; and a protruding portion 242 located forward of the main body 243, protruding radially outward, and larger in outer diameter than the main body 243. The protruding portion 242 is disposed forward of the mounting member 250 and protrudes radially outward beyond an inner surface 250s of the mounting member 250 (see FIG. 2).

The main body 243 has a two-stage shape including a first section 244 located on the forward end side and a second section 246 located on the rear end side and smaller in outer diameter than the first section. The metal tube 212 is inserted into the through hole 240h such that the rear end of the metal tube 212 is located inside the second section 246, and then laser welding, for example, is performed over the entire radial circumference of the second section 246, whereby the metal tube 212 is joined to the main body 243 (the rib 240) through a joint portion W2.

A forward end portion of the joint 260 is fitted onto the first section 244, and laser welding, for example, is performed over the entire radial circumference of the first section 244, whereby the joint 260 is joined to the main body 243 (the rib 240) through a joint portion W1. As described above, the rib 240 holds the joint 260 with the rear end of the joint 260 protruding from the rear end of the rib 240.

In the present embodiment, the joint 260 is larger in diameter than the metal tube 212, but this is not a limitation. In the present embodiment, the metal tube 212 and the joint 260 partially overlap each other in the direction of the axial line L. However, the metal tube 212 and the joint 260 may not overlap each other in the direction of the axial line L.

The metal tube 212 and the joint 260 may be joined to the main body 243 not only by welding such as laser welding but also by, for example, press fitting or crimping.

In a cross-sectional view taken in the direction of the axial line L as shown in FIG. 2, a flat portion 244L having a length equal to or greater than the thickness t of the second tubular member 260 and parallel to the radial direction is formed to extend radially outward from an outer surface 244s of the main body 243 (the first section 244). The flat portion 244L faces a forward-facing surface 260f of the second tubular member 260. A rearward-facing surface of the protruding portion 242 includes an inclined surface 242b, which is a tapered surface that extends radially outward such that its diameter increases gradually toward the forward end side with respect to the direction of the axial line L. The inclined surface 242b is connected, on its radially inward side, to the flat portion 244L.

A forward-facing surface (seat surface) 242f of the protruding portion 242 is a flat surface parallel to the radial direction and is configured to abut against (to be in direct contact with) a mounting surface 300r of the mount body 300 to thereby prevent exhaust gas from leaking to the outside. After the forward-facing surface 242f is disposed so as to be in contact with the mounting surface 300r, a threaded portion 254 (described later) of the mounting member 250 is screwed into a female threaded portion 300s formed on the circumference wall of the mounting hole 300h, whereby the sensor 200 is fixed to a sensor mounting position.

In the present embodiment, the mounting surface 300r is of the flat seal type, i.e., is parallel to the radial direction (flat). The mounting surface 300r extends radially inward from an inner wall 300w of the mounting hole 300h, and a central opening 300h2 is formed at the center of the mounting surface 300r. The central opening 300h2 forms part of the mounting hole 300h, and the forward end of the metal tube 212 is inserted through the central opening 300h2. Specifically, the forward end of the metal tube 212 protrudes from the central opening 300h2 toward the inside of the mount body 300 to detect the temperature of, for example, exhaust gas.

The mounting member 250 surrounds the radial circumference of the rib 240 (the main body 243) through the joint 260 in a region rearward of the protruding portion 242 and is fitted onto the rib 240 so as to be rotatable around the joint 260.

A threaded portion (male thread) 254 that is to be screwed into the mounting hole 300h of the mount body 300 is formed on the outer surface of the mounting member 250. A hexagonal nut portion 252 is formed rearward of the threaded portion 254, and a tool is engaged with the hexagonal nut portion 252 to rotate and threadedly mount the mounting member 250.

A forward-facing surface 250f of the mounting member 250 is a tapered surface that extends radially outward such that its diameter increases gradually toward the forward end side with respect to the direction of the axial line L.

Referring next to FIG. 2, the state of contact between the rib 240 and the mounting member 250 will be described.

In FIG. 2, the tapered angle of the forward-facing surface 250f of the mounting member 250 is smaller than the tapered angle of the inclined surface 242b of the protruding portion 242. Therefore, when the threaded portion 254 of the mounting member 250 is screwed into the mounting hole 300h of the mount body 300, the forward-facing surface 250f comes into line contact with the inclined surface 242b at a prescribed contact position P (into contact with the inclined surface 242b on a circle about the axial line L that passes through the contact position P). The forward-facing surface 242f of the protruding portion 242 pressed by the mounting member 250 abuts against the mounting surface 300r to form a seal. The tapered angles of the forward-facing surface 250f and the inclined surface 242b are angles formed by their respective two generating lines in a cross-sectional taken in the direction of the axial line L.

In this case, an intersection R of the inclined surface 242b and a perpendicular M thereto from a radially innermost point Q of the forward-facing surface 242f is located radially inward of the contact position P. When the sensor 200 is threadedly mounted to the mount body 300, pressing force (stress) F transmitted from the forward-facing surface 250f of the mounting member 250 to the protruding portion 242 through the contact position P is concentrated on a prescribed region about a perpendicular N to the inclined surface 242b at the contact position P (see FIG. 6).

The mounting surface 300r that receives the pressing force F is formed in a region radially outward of the edge of the central opening 300h2, i.e., formed radially outward of the central opening 300h2. Since the forward end of the metal tube 212 passes through the central opening 300h2, the edge of the central opening 300h2 is located radially outward of the point Q.

Therefore, when the intersection R is located radially inward of the contact position P, the contact position P and thus the pressing force F are shifted radially outward, and a larger amount of the pressing force F is applied to a radially outward portion of the mounting surface 300r in a concentrated manner, so that the seal between the protruding portion 242 and the mounting surface 300r becomes more firm.

As a result, loosening of the threaded portion 254 can be significantly restrained. Particularly, even when the sensor 200 is used at high temperature and the difference in thermal expansion coefficient between the material of the mount body 300 and the materials of the sensor 200 becomes large, loosening of the threaded portion 254 can be effectively restrained. The larger the degree of concentration of the pressing force F applied to the mounting surface 300r, the larger the plastic deformation of the mounting surface 300r. Therefore, its elastic limit increases, and this may allow loosening of the threaded portion 254 to be restrained.

It is preferable that the forward-facing surface 250f of the mounting member 250 is a tapered surface with a tapered angle of 120±20°. This is because the pressing force F can be appropriately transmitted to the mounting surface 300r. If the tapered angle exceeds the above range, the pressing force F is applied to the entire portion of the mounting surface 300r in a dispersed manner, so that the above-described effect of plastic deformation due to the concentration of the pressing force F tends to be reduced. If the tapered angle is below the above range, a component of the pressing force F in the direction of the axial line L becomes small, and the pressing force F itself applied to the mounting surface 300r tends to decrease.

As described above, the pressing force F is applied to the periphery of the contact position P, and the joint 260 is joined to a portion radially inward of the inclined surface 242b. Therefore, by shifting the contact position P and thus the pressing force F radially outward, the contact position P can be spaced away from the joint 260. In this case, a reduction in the joint strength of the joint portion W1 of the joint 260 due to the pressing force F applied to the joint portion W1 can be suppressed, and deformation of the joint 260 can also be suppressed.

Figure 3A:
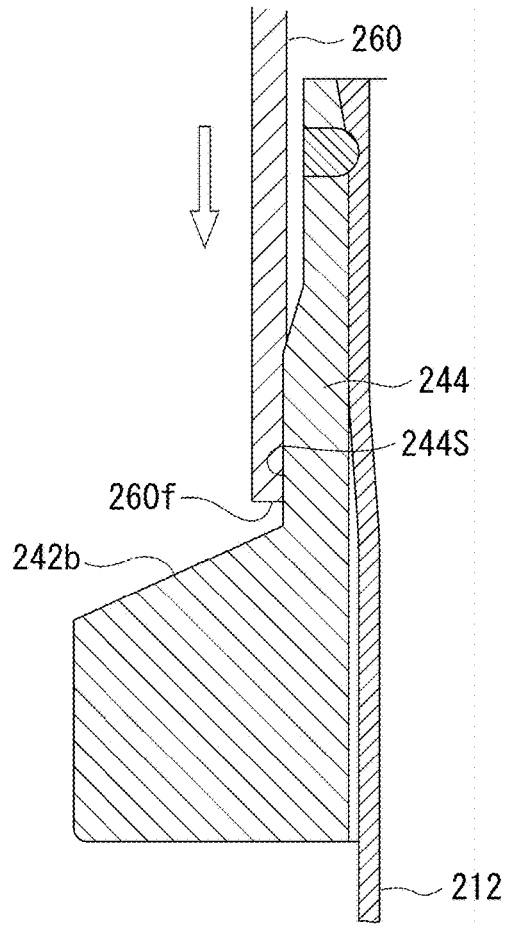
FIGS. 3(a) and 3(b) are views showing a step of attaching a joint to a rib for the case where the rib has no flat portion.
Figure 3B:
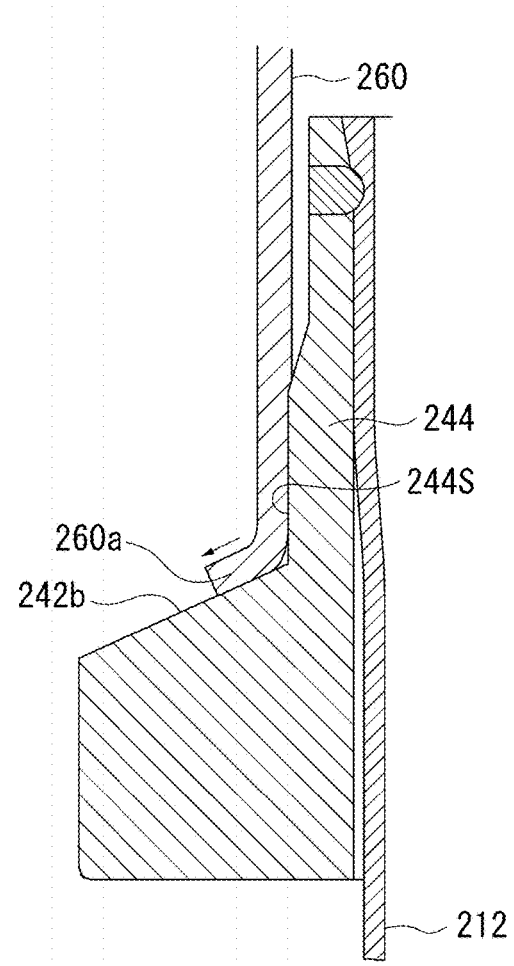

In the present embodiment, the flat portion 244L provided allows the deformation of the joint 260 to be further restrained. This will be described with reference to FIG. 3(a) and FIG. 3(b). FIGS. 3(a) and 3(b) are views showing a step of attaching the joint 260 for the case where the flat portion 244L is not provided and the inclined surface 242b extends radially inward to the outer surface 244s of the first section 244.

First, the joint 260 is mounted by fitting it onto the main body 243 (the first section 244) from the rear end side (FIG. 3(a)). In this case, if pressing force applied to the joint 260 is excessively large or the insertion depth of the joint 260 is excessively large, the forward-facing surface 260f of the joint 260 comes into contact with the inclined surface 242b. Since the inclined surface 242b has a tapered shape, the inclined surface 242b comes into local contact with part of the forward-facing surface 260f, and contact pressure becomes high. Therefore, a forward end portion 260a of the joint 260 is pressed and expanded radially outward by the inclined surface 242b (FIG. 3(b)), and the joint 260 is thereby deformed.

In order to overcome such a problem, the flat portion 244L is provided as shown in FIG. 2. In this case, the forward-facing surface 260f of the joint 260 comes in surface contact with the flat portion 244L, whereby the contact pressure decreases. Therefore, the deformation of the joint 260 can be suppressed even when the pressing force applied to the joint 260 is large or the insertion depth of the joint 260 is large.

The pressing force applied to the joint 260 for attachment may vary among sensors, and the forward-facing surface 260f of the joint 260 does not always come into contact with the flat portion 244L. A gap in the direction of the axial line L may be formed therebetween.

Preferably, in the cross-sectional view taken in the direction of the axial line L shown in FIG. 2, a second intersection T of the inclined surface 242b and a perpendicular K thereto from a point of contact S that is the radially innermost point at which the forward-facing surface 242f of the protruding portion 242 abuts against the mounting surface 300r is located radially inward of the contact position P.

When the second intersection T is located radially inward of the contact position P, the contact position P and thus the pressing force F are shifted radially outward. In this case, a larger amount of the pressing force F is applied to the radially outward portion of the mounting surface 300r, so that the seal between the protruding portion 242 and the mounting surface 300r becomes more firm.

The point of contact S is the point at which the forward-facing surface 242f of the protruding portion 242 and the mounting surface 300r start being separated from each other on the radially inner side and is defined by an inflection point of the forward-facing surface 242f or the mounting surface 300r in the separation region. In the example in FIG. 2, since an edge of the mounting surface 300r that is closer to the central opening 300h2 is chamfered, the point of contact S is the intersection of the chamfered portion and the forward-facing surface 242f.

Figure 4:
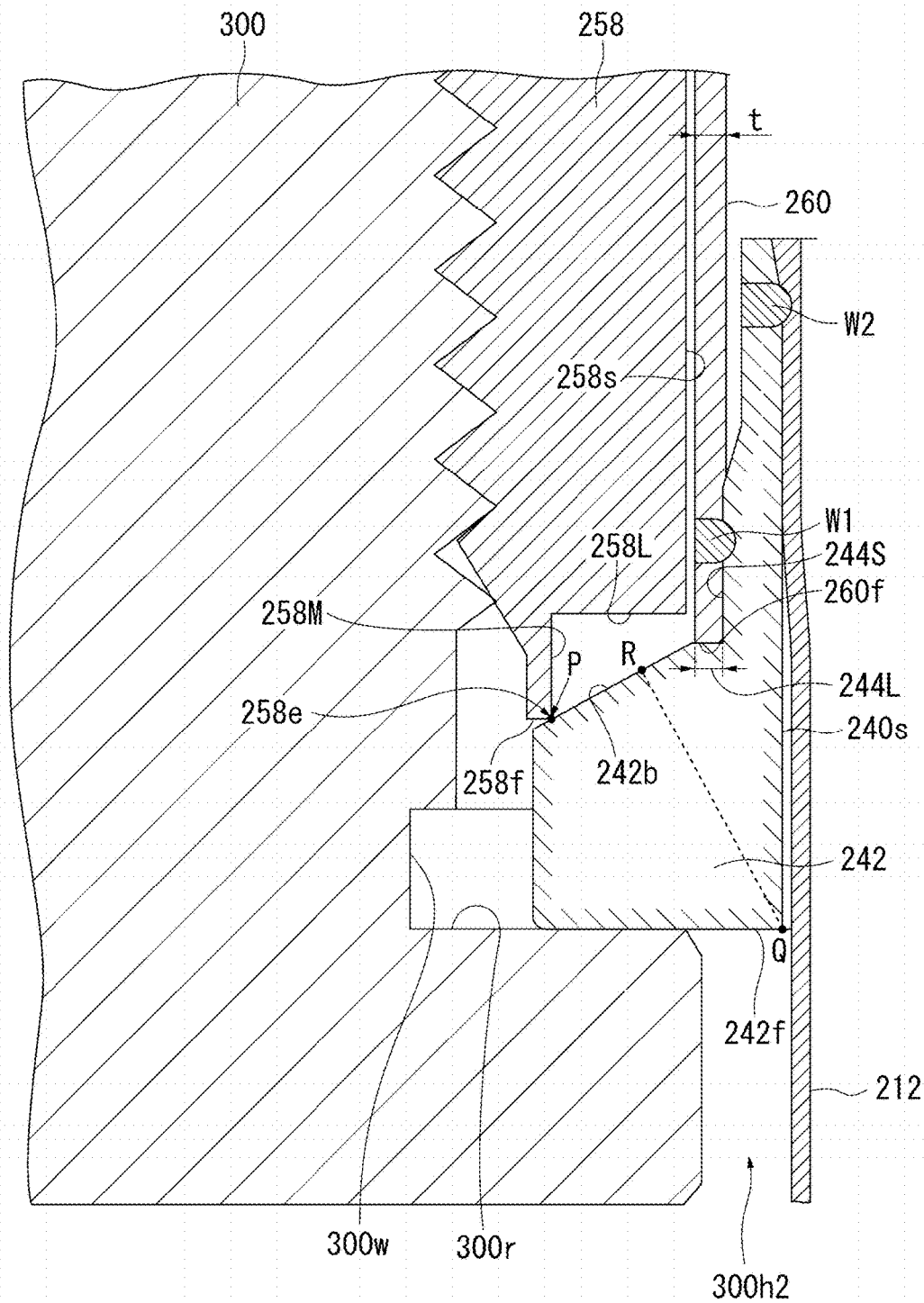
FIG. 4 is an enlarged partial cross-sectional view illustrating a sensor according to a second embodiment of the present invention.

Referring next to FIG. 4, a sensor according to a second embodiment of the present invention will be described. The sensor according to the second embodiment is the same as the sensor according to the first embodiment except for the structure of the forward end of a mounting member 258. Therefore, the structural portion different from that of the first embodiment will be described using FIG. 4, which is an enlarged partial view corresponding to FIG. 2.

In FIG. 4, the mounting member 258 has a flat portion 258L that extends radially outward from its inner surface 258s so as to be parallel to the radial direction; and a protruding portion 258M having a rectangular cross section, located radially outward of the flat portion 258L, and protruding from the flat portion 258L toward the forward end side. A 90° corner portion 258e facing a radially inward side is formed on a forward-facing surface 258f of the protruding portion 258M, and the forward-facing surface 258f and the inner surface 258s of the protruding portion 258M are connected at the corner portion 258e.

Also in the second embodiment, when the mounting member 258 is threadedly mounted to the mount body 300, the corner portion 258e comes into line contact with the inclined surface 242b at a contact position P. Therefore, when the intersection R is located radially inward of the contact position P, the contact position P and thus the pressing force F are shifted radially outward.

Figure 5:
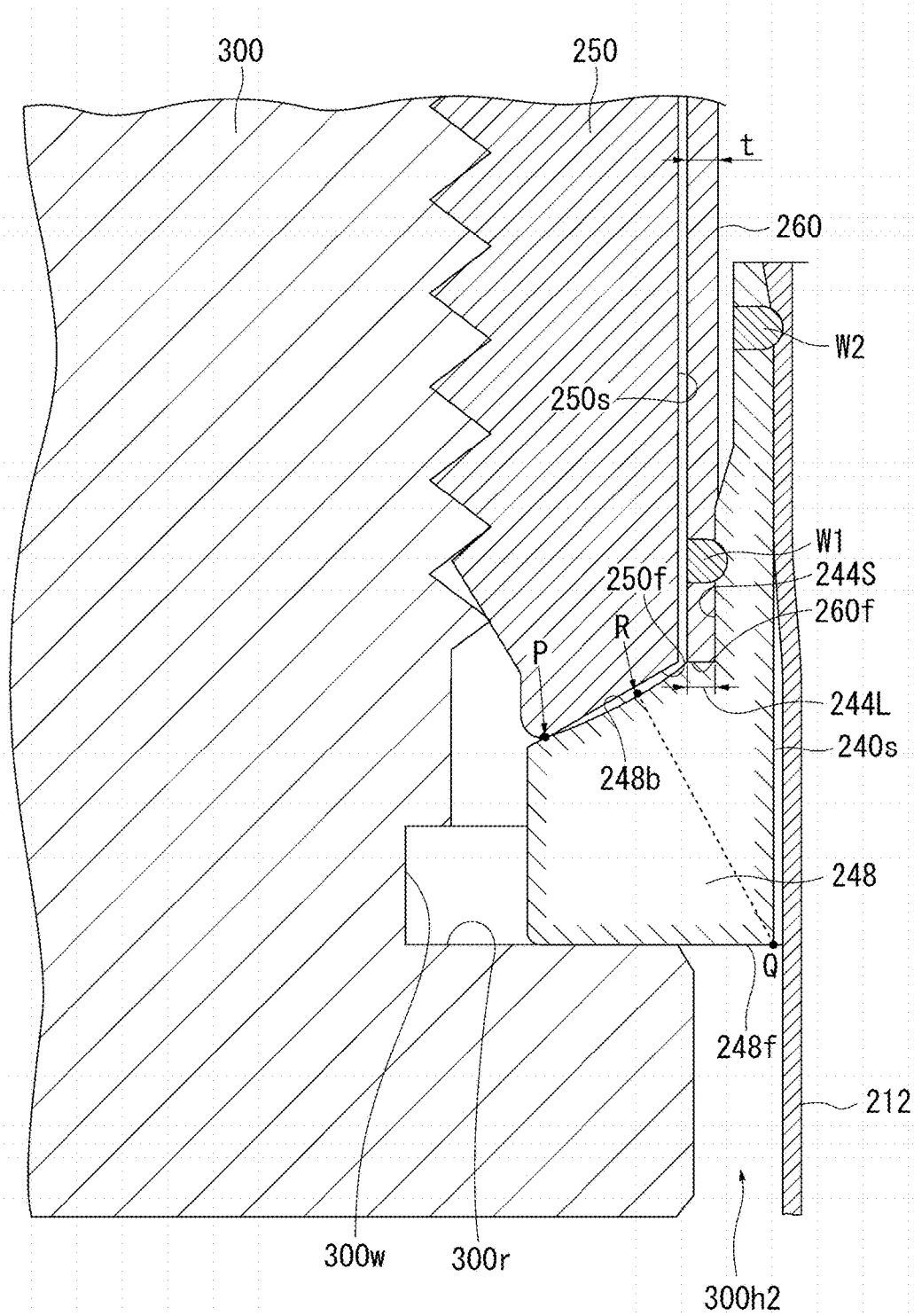
FIG. 5 is an enlarged partial cross-sectional view illustrating a sensor according to a third embodiment of the present invention.

Referring next to FIG. 5, a sensor according to a third embodiment of the present invention will be described. The sensor according to the third embodiment is the same as the sensor according to the first embodiment except that an inclined surface 248b of a protruding portion 248 is a concave surface (R surface). Therefore, the structural portion different from that of the first embodiment will be described using FIG. 5, which is an enlarged partial view corresponding to FIG. 2.

In FIG. 5, the inclined surface 248b of the protruding portion 248 is formed as a concave surface (R surface) extending radially outward such that its diameter increases toward the forward end side with respect to the direction of the axial line L. Also in the third embodiment, when the mounting member 250 is threadedly mounted to the mount body 300, the forward-facing surface 250f comes into line contact with the inclined surface 248b at a contact position P. Therefore, when the intersection R is located radially inward of the contact position P, the contact position P and thus the pressing force F are shifted radially outward.

Needless to say, the present invention is not limited to the embodiments described above and encompasses various modifications and equivalents within the spirit and scope of the present invention.

For example, the sensor is not limited to the temperature sensor described above, and may be a gas sensor. Examples of the gas sensor include NOx sensors, oxygen sensors ($\lambda$ sensors), full-range air-fuel ratio sensors, and ammonia sensors. When the sensor is a gas sensor, a tubular protector that surrounds a forward end portion of a sensor element having a detection portion corresponds to the "first tubular member."

The inclined surface formed on the rearward-facing surface of the protruding portion is not limited to be directly connected, on its radially inward side, to the flat portion as shown in FIG. 2, and a portion having a shape different from the shapes of the inclined surface and the flat portion may be provided therebetween.

When a corner portion is provided on the forward-facing surface of the mounting member, the angle of the corner portion is not limited to 90°, and the corner portion may be formed to have an acute or obtuse angle.

The inclined surface of the protruding portion may be a convex surface (R surface) extending radially outward such that its diameter increases toward the forward end side with respect to the direction of the axial line.

In the embodiments described above, the "portion that encloses the temperature sensitive element" and the "portion held by the rib" are formed as a single (one) first tubular member, but the structure of the first tubular member is not limited thereto. The "portion that encloses the temperature sensitive element" and the "portion held by the rib" may be separate members jointed to each other. Such a temperature sensor corresponds to a temperature sensor of a so-called cap type (the type in which a cap that encloses the temperature sensitive element is joined to the forward end of a sheath tube).

EXAMPLE

FEM (finite element method) analysis that reproduced the state of contact between the rib 240 and the mounting member 250 shown in FIG. 2 was performed, and the analysis was referred to as an "Example." Similar FEM analysis was performed with the contact position P located at a position radially inward of the intersection R and adjacent to the joint 260 in FIG. 2, and the analysis was referred to as a "Comparative Example." In the Example and Comparative Example, the object was to analyze the distribution of stress transmitted from the protruding portion 242 to the mounting surface 300r. Therefore, the flat portion 244L of the main body 243 was not reproduced.

Figure 6:
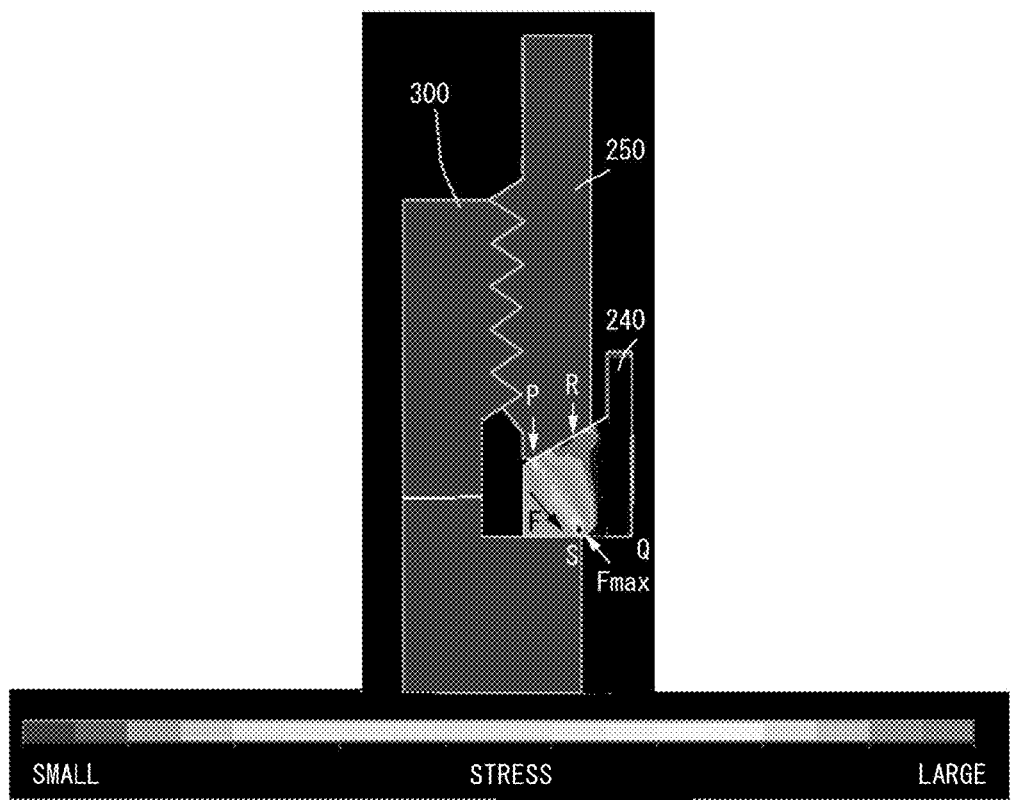
FIG. 6 is an enlarged partial cross-sectional view illustrating pressing force (stress) transmitted to a protruding portion of a sensor according to an Example of the present invention.
Figure 7:
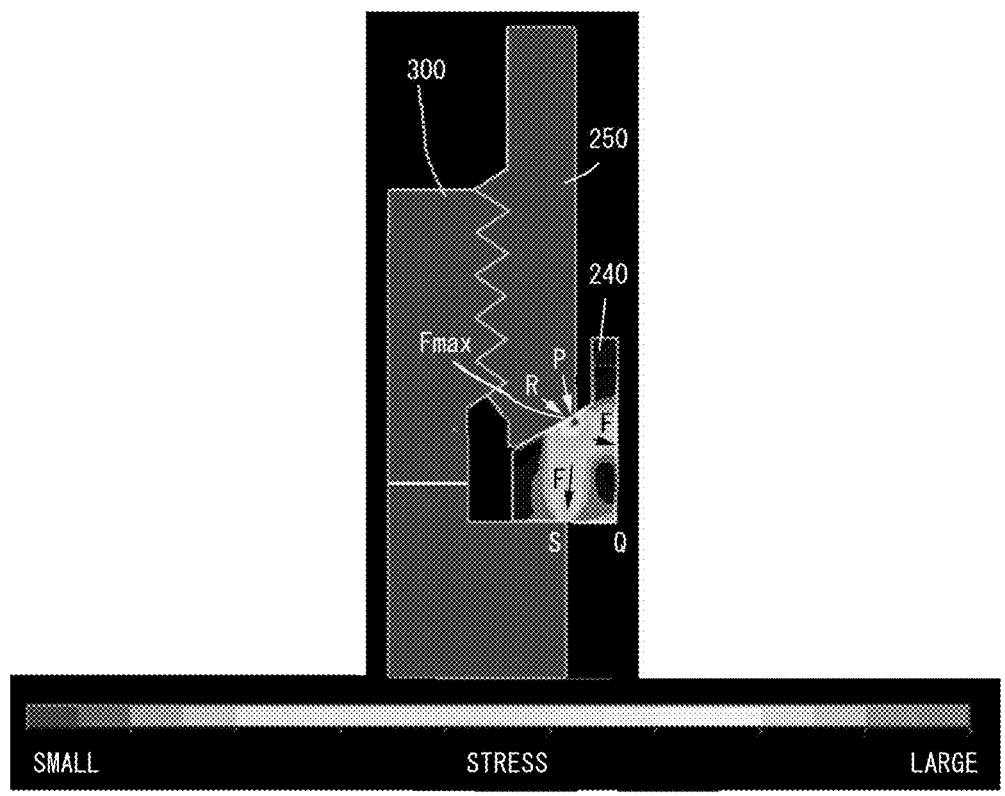
FIG. 7 is an enlarged partial cross-sectional view illustrating pressing force (stress) transmitted to a protruding portion of a sensor according to a Comparative Example.

The results obtained are shown in FIGS. 6 and 7.

In the Example in which the intersection R is located radially inward of the contact position P as shown in FIG. 6, the pressing force (stress) F transmitted from the forward-facing surface 250f of the mounting member 250 to the protruding portion 242 through the contact position P is concentrated on a predetermined region along the perpendicular to the inclined surface 242b at the contact position P. The pressing force F becomes maximum stress Fmax (a black point in FIG. 6) in the vicinity of the point of contact S of the mounting surface 300r, and this shows that the pressing force F is concentrated on part of the mounting surface 300r.

In the Comparative Example shown in FIG. 7, the intersection R is located radially outward of the contact position P. Therefore, the pressing force (stress) F transmitted from the forward-facing surface 250f of the mounting member 250 to the protruding portion 242 through the contact position P is dispersed over a wide area. The pressing force F is not concentrated on the mounting surface 300r, and the maximum stress Fmax is located at a position radially inward of the contact position P and adjacent to the joint 260 (a black point in FIG. 7). Therefore, the maximum stress Fmax may cause a reduction in the joint strength of the joint 260 or deformation of the joint 260.

DESCRIPTION OF REFERENCE NUMERALS

200: sensor
203: temperature sensitive element
212: first tubular member
240: rib
242: protruding portion
242b: inclined surface
242f: forward-facing surface of protruding portion
243: main body
244s: outer surface of main body
244L: flat portion
250: mounting member
250e: corner portion of forward-facing surface of mounting member
250f: tapered surface on forward-facing surface of mounting member
250s: inner surface of mounting member
254: threaded portion
260: second tubular member
260f: forward-facing surface of second tubular member
300: mount body
300h: mounting hole
300s: mounting surface
L: axial line
t: thickness of second tubular member
P: contact position
Q: radially innermost point of forward-facing surface of protruding portion
R: intersection
S: point of contact
T: second intersection
M: perpendicular to inclined surface from point Q
K: perpendicular to inclined surface from point of contact point S

The invention claimed is:

1. A sensor comprising:
a temperature sensitive element whose electrical property changes with temperature;
a first tubular member that has a tubular shape and extends in a direction of an axial line, the temperature sensitive element being enclosed by the first tubular member at a forward end thereof;
a tubular rib that surrounds a radial circumference of the first tubular member with the forward end of the first tubular member protruding from a forward end of the rib;
a second tubular member that has a tubular shape, surrounds a radial circumference of a rear end portion of the rib, and extends rearward in the direction of the axial line; and
a tubular mounting member that surrounds the radial circumference of the rib through the second tubular member and is rotatable with respect to the rib, the tubular mounting member having on an outer surface thereof a threaded portion, wherein
the rib includes a main body and a protruding portion, the main body being disposed inside the mounting member, a forward end portion of the second tubular member being fitted onto the main body, the protruding portion being disposed forward of the main body, protruding radially outward beyond an inner surface of the mounting member, surrounding the radial circumference of the first tubular member, and having a forward-facing surface including a flat surface parallel to a radial direction,
in a cross-sectional view taken in the direction of the axial line, the protruding portion has a rearward-facing surface including a flat portion and an inclined surface, the flat portion being parallel to the radial direction, having a length equal to or greater than the thickness of the second tubular member, and facing a forward-facing surface of the second tubular member, the inclined surface being disposed radially outward of the flat portion and extending radially outward such that the diameter of the inclined surface increases toward a forward end side with respect to the direction of the axial line,
a forward-facing surface of the mounting member is in line contact with the inclined surface at a prescribed contact position, and
in the cross-sectional view, an intersection of the inclined surface and a perpendicular thereto from a radially innermost point of the forward-facing surface of the protruding portion is located radially inward of the contact position.

2. The sensor as claimed in claim 1, wherein,
when the threaded portion of the mounting member is screwed into a mounting hole of a mount body, the forward-facing surface of the protruding portion abuts against a mounting surface of the mount body, and a forward end portion of the first tubular member protrudes into the mount body through the mounting hole, and
in the cross-sectional view, a second intersection of the inclined surface and a perpendicular thereto from a point of contact that is a radially innermost point at which the forward-facing surface of the protruding portion abuts against the mounting surface is located radially inward of the contact position.

3. The sensor as claimed in claim 1, wherein the inclined surface is a tapered surface that extends radially outward such that the diameter of the tapered surface increases gradually toward the forward end side with respect to the direction of the axial line.

4. A sensor mounting structure comprising: a mount body having a mounting hole; and a sensor having on an outer surface thereof a threaded portion threadedly mounted to the mount body, the sensor being threadedly mounted to the mount body with the threaded portion screwed into the mounting hole of the mount body, wherein the sensor is a sensor as claimed in claim 1.

* * * * *